June 17, 1969
J. E. RILEY
3,450,891
SYNCHRONOUS TRIAC CONTROL
Filed Aug. 18, 1966
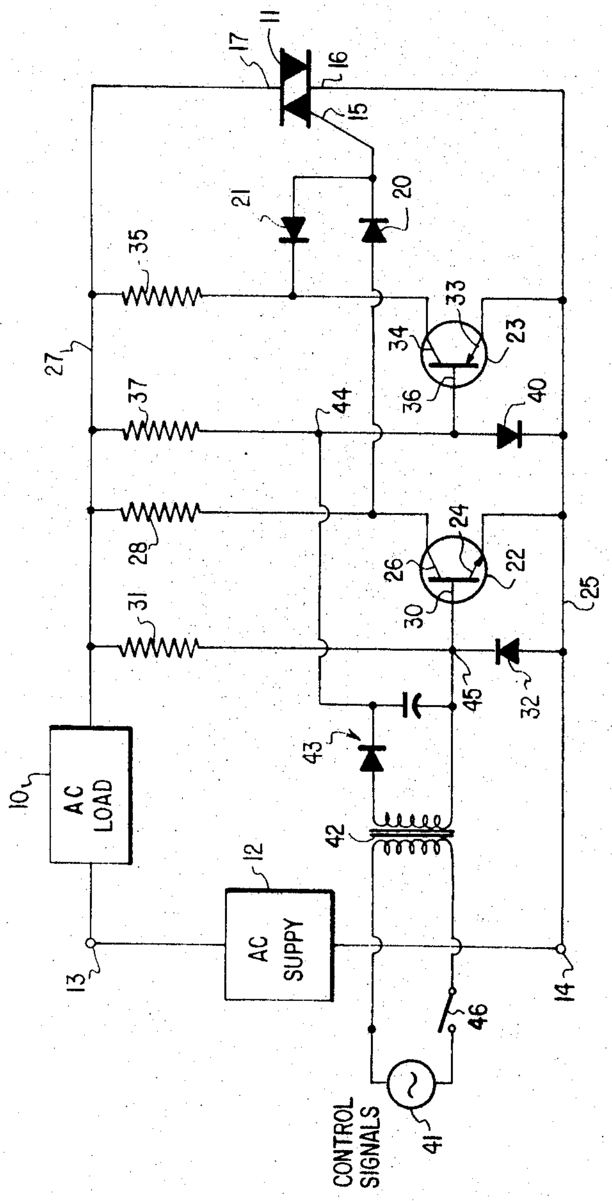
INVENTOR.
JOHN E. RILEY
BY Richard E. Hosley
ATTORNEY.

United States Patent Office 3,450,891

Patented June 17, 1969

3,450,891
SYNCHRONOUS TRIAC CONTROL

John E. Riley, Saugus, Mass., assignor to General Electric Company, a corporation of New York Filed Aug. 18, 1966, Ser. No. 573,292
Int. Cl. H01h 7/16
U.S. Cl. 307—133 1 Claim

ABSTRACT OF THE DISCLOSURE

A triac switching circuit. A pair of transistors are normally conductive during alternate half cycles of an energizing source to shunt the triac gate electrode and thereby disable the triac. Simulteanous energization by a control voltage and a zero energizing source voltage de-energizes one transistor to allow a gate current to turn on the triac for the next half cycle. Application of a control signal at other times is ineffective.

*Background of the invention*

This invention relates to triac control circuits and more specifically to control circuits for switching relatively high energy to a load.

It is not uncommon to have communications interference problems arise when high power circuits are closed or opened because the sudden change in energy level can cause oscillations in reactive circuit components which normally are present in such circuits. These noise signals often interfere with radio reception, and much work has been done in order to overcome the generation of such noise during switching operations.

In this investigation it has been found that most A-C circuits generate a minimum of noise signals if they are opened when the circuit current is zero and if they are closed when the source voltage is zero. When gate-controlled conducting devices, such as semiconductor-controlled rectifiers (SCR's) are used as switching components, some of the noise problems are minimized due to the inherent latching characteristic of the SCR's. That is to say, once they are turned on, they can turn off only when the current flowing through them is substantially zero. For example, an SCR opens the circuit when the current flow through it reaches zero; as long as the gate drive current has been removed from the gate electrode of the SCR it will not begin to conduct again. Thus, the gate-controlled conducting devices operate in accordance with one of the experimentally found conditions for minimizing noise signals. However, if the circuit is closed in a random pattern, noise is still generated by the circuit closing.

SCR's are being replaced in some applications by symmetrical switching devices such as triacs which are full-wave A-C control elements which conduct current when a current signal of proper magnitude is applied to a control electrode. To ensure that the triac enters conduction only at an approximately zero voltage so that noise is minimized, several circuits have been designed in the prior art to control the triac current signal. In one such cricuit a pair of separate, gate-controlled semi-conductor devices, such as SCR's, control triac firing. Generally, these circuits have included circuitry which permits firing of the triac when no control signal is present, but this can be disadvantageous if fail-safe requirements exist. As a plurality of gate-controlled semiconductor devices normally fire the triac, increased expenses are incurred. Furthermore, half-cycle control either is not possible or is difficult to obtain as the power generally is changed in full-cycle increments when these circuits are used.

It is an object of this invention to provide a control circuit for a triac whereby the triac is fired only at zero voltages if a control signal is present, the control circuit including low-power semiconductor devices.

Another object of this invention is to provide a triac firing circuit which fires the triac only at zero voltages if a control signal is present and which permits half-cycle control.

*Summary*

In substance, power control is accomplished in accordance with this invention by coupling the gate of the symmetrical gate-controlled semiconductive device to a source of control signals through switching means independently sensitive to both half cycles so that the switching means assumes a state whereby current signals are applied to the gate so the semiconductor device conducts through an entire half cycle when a control signal is present. More specifically, a pair of semiconductor switching devices having opposite characteristics are connected in parallel with the triac and one electrode of each semiconductor switching device serves as a source of triac current signals when a control signal is present which causes either of the semiconductor switching devices to be nonconductive.

*Brief description of the drawings*

This invention has been pointed out with particularly in the appended claims. A more thorough understanding of the above and further objects and advantages of this invention may be realized by referring to the following detailed description of a preferred embodiment of this invention taken in conjunction with the accompanying drawing which schematically illustrates a firing circuit constructed in accordance with this invention.

*Description of an illustrative embodiment*

Referring to the drawing, it will be seen that an A-C load 10 and a triac 11 are connected in series with an A-C supply 12 having terminals 13 and 14. The triac 11 has a gate electrode 15, a first anode 16 and a second anode 17. As is well known in the art, the triac 11 conducts current when either a positive current signal or a negative current signal is applied to the gate electrode 15. In the circuit shown when the potential at the terminal 13 is positive with respect to that of the terminal 14, a positive current signal applied to the gate 15 through a diode 20 causes the triac 11 to conduct current. Similarly, when the terminal 13 is negative with respect to the terminal 14, a negative current signal applied to the gate 15 through a diode 21 causes the triac 11 to conduct.

Positive and negative current signals are produced by a control circuit comprising an NPN transistor 22 and a PNP transistor 23. The NPN transistor 22 has its emitter 24 coupled to a conductor 25 which connects first anode electrode 16 to the terminal 14 while its collector 26 is coupled to a conductor 27, which interconnects the second anode 17 to the load 10, through a resistor 28. The base 30 is connected to the conductor 27 by a resistor 31 and to the conductor 25 by a diode 32 poled to conduct from the conductor 25 to the base 30.

A similar circuit of opposite polarity is provided by the transistor 23 and its associated circuitry. An emitter 33 is connected to the conductor 24 while a collector 34 is coupled to the conductor 27 by the resistor 35. A base 36 is coupled to the conductor 27 by a resistor 37 and to the conductor 25 by a diode 40 poled to conduct from the base 36 to the conductor 25.

The transistors 22 and 23 are energized by a control circuit shown as comprising a source of A-C control signals 41 which are coupled through a transformer 42 and rectified by a half-wave rectifier network 43. A positive output terminal of this network, designated as 44, is connected to the base 36 while a negative output terminal 45 is connected to the base 30.

If the control signal source 41 is not coupled to the transformer by a switching means designated by a switch 46, then the diode 32 is reverse biased when the terminal 13 is positive with respect to the terminal 14; and the transistor 23 is nonconductive because it is also reverse biased. As the diode 32 is nonconductive, the transistor 22 conducts at approximately zero voltage; and the collector 26 remains at a low voltage. In addition, the diode 21 blocks any current signal from reaching the gate electrode 15 through the collector circuit of the transistor 23 so the triac 11 is maintained nonconductive. A similar analysis shows that on the opposite half cycle the transistor 23 conducts while the diode 20 blocks, so that no current signal is transmitted to the triac 11. Therefore, when the switch 46 is open so there is no control signal, no current signal is applied to the gate electrode 15 of the triac 11 to cause conduction. If a control signal is applied after either the transistor 22 or 23 has become conductive, it has no effect as the control signal is effectively swamped out by the magnitude of the current flowing in the then conducting transistor.

However, if the control signal is applied at zero voltage, a positive voltage appears on the conductor at the terminal 44 and a negative voltage appears at the terminal 45, causing both diodes 32 and 40 to be conductive. Hence, at near zero voltages across the triac 11 the base electrodes of both the transistors 22 and 23 are effectively clamped to a value which does not permit conduction of either the transistor 22 or the transistor 23. Therefore, during half cycles when the terminal 13 is positive, the positive supply voltage supplies a current signal through the resistor 28 and the diode 20 to the gate electrode 15; and the triac 11 conducts. On opposite half cycles, a negative current signal is applied to the gate electrode 15 from the conductor 25 through the resistor 35 and the diode 21.

Hence, this circuit permits conduction only if a control signal is applied when the triac voltage is at zero. Beyond zero, the magnitude of the energizing power effectively swamps out any control signals. Furthermore, as the transistors 22 and 23 are independently controlled by the control signal, half-cycle control is feasible. Another advantage over the prior art is found in the use of low-power controlling semiconductor devices which can be incorporated because the collector-emitter voltage is always clamped to a low voltage. Therefore, a control circuit has been provided which minimizes switching noise and which utilizes inexpensive low-power transistor devices to perform the control function.

The foregoing is a description of an illustrative embodiment of the invention, and it is the intention in the appended claim to cover all forms which fall within the scope of the invention.

What is claimed as new and desired to be secured by Letters Patent of the United States is:

1. In a system for controlling current flow from an alternating current source through a load including a triac having a gate electrode, the triac being in series between the source and the load, and means for selectively producing a control signal, the improvement of means for rendering the triac conductive when the control signal exists and the alternating current source voltage is substantially zero comprising:

(a) first switching means including an NPN transistor coupled across the triac and a first diode and a first resistor connected across the triac and to said NPN transistor to conduct current from the emitter to the base thereof, the base being connected to be energized by the control signals, and a second diode connecting the collector of said NPN transistor to the triac gate electrode to apply a signal thereto during one half cycle when said NPN transistor is rendered non-conductive by the control signal being present when the voltage across the triac is substantially zero at the beginning of said one half cycle; and (b) a second switching means including a PNP transistor coupled across the triac, and a third diode and a second resistor connected across the triac and to said PNP transistor to conduct current from the base to the emitter thereof, the base being connected to be energized by the control signals, and a fourth diode connecting the collector of said PNP transistor to the triac gate electrode to apply a signal thereto during the opposite half cycle when said PNP transistor is rendered nonconductive by the control signal being present when the voltage across the triac is substantially zero at the beginning of said opposite half cycle.

References Cited

UNITED STATES PATENTS

| | | | |
|---|---|---|---|
| 3,237,030 | 2/1966 | Coburn | 307—136 X |
| 3,283,179 | 11/1966 | Carlisle et al. | 307—133 |
| 3,321,668 | 5/1967 | Baker. | |
| 3,335,291 | 8/1967 | Gutzwiller | 307—252 |
| 3,335,294 | 8/1967 | Chauprade | 307—288 X |

FOREIGN PATENTS

| | | |
|---|---|---|
| 945,249 | 12/1963 | Great Britain. |

ROBERT K. SCHAEFER, *Primary Examiner.*

T. B. JOIKE, *Assistant Examiner.*

U.S. Cl. X.R.

307—252